US008640217B2

(12) United States Patent
Thawani et al.

(10) Patent No.: US 8,640,217 B2
(45) Date of Patent: *Jan. 28, 2014

(54) METHOD AND SYSTEM FOR IMPROVED COMMUNICATION NETWORK SETUP UTILIZING EXTENDED TERMINALS

(75) Inventors: Manoj Thawani, Sunnyvale, CA (US); Mahesh Iyer, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 13/089,413

(22) Filed: Apr. 19, 2011

(65) Prior Publication Data

US 2011/0194549 A1     Aug. 11, 2011

Related U.S. Application Data

(63) Continuation of application No. 11/208,347, filed on Aug. 18, 2005, now Pat. No. 7,930,737.

(60) Provisional application No. 60/602,396, filed on Aug. 18, 2004, provisional application No. 60/671,120, filed on Apr. 14, 2005.

(51) Int. Cl.
    *H04W 40/00*        (2009.01)
    *H04W 84/02*        (2009.01)

(52) U.S. Cl.
    USPC .............................. 726/11; 370/338; 370/228

(58) Field of Classification Search
    USPC ..................................... 726/11; 370/328, 338
    See application file for complete search history.

(56) References Cited

U.S. PATENT DOCUMENTS

| 5,231,634 | A | 7/1993 | Giles et al. |
| 5,930,358 | A | 7/1999 | Rao |
| 5,940,509 | A | 8/1999 | Jovanovich et al. |
| 6,052,600 | A | 4/2000 | Fette et al. |
| 6,201,958 | B1 | 3/2001 | Boucher |

(Continued)

OTHER PUBLICATIONS

IEEE Std. 802.11, 2003 Edition, "Information technology—Telecommunications and information exchange between systems—Local and metropolitan area networks—Specific requirements—Part 11; Wireless LAN Medium Access Control (MAC) and Physical Layer (PHY) Specifications," pp. 9-65, Jun. 12, 2003.

(Continued)

*Primary Examiner* — Kambiz Zand
*Assistant Examiner* — Aubrey Wyszynski
(74) *Attorney, Agent, or Firm* — Garlick & Markison; Edward J. Marshall

(57) ABSTRACT

Aspects of a method and system for improved communication network setup utilizing extended terminals are presented. Aspects of the method may comprise configuring a wireless Ethernet terminal functioning as a client station by a configurator via a network. The configured wireless Ethernet terminal may wirelessly receives information from a wireless station, and communicate the wirelessly received information to at least one of a plurality of wired stations via at least one of a plurality of corresponding wired interfaces. Aspects of the system may comprise a collocated device functioning as a configurator that configures a wireless Ethernet terminal functioning as a client station via a network. The configured wireless Ethernet terminal may wirelessly receives information from a wireless station, and communicate the wirelessly received information to at least one of a plurality of wired stations via at least one of a plurality of corresponding wired interfaces.

20 Claims, 7 Drawing Sheets

(56) References Cited

U.S. PATENT DOCUMENTS

| | | |
|---|---|---|
| 6,212,639 B1 | 4/2001 | Erickson |
| 6,477,150 B1 | 11/2002 | Maggenti et al. |
| 6,549,786 B2 * | 4/2003 | Cheung et al. ............... 455/524 |
| 6,779,069 B1 | 8/2004 | Treichler et al. |
| 6,782,260 B2 | 8/2004 | Nakakita et al. |
| 6,785,816 B1 | 8/2004 | Kivimaki et al. |
| 6,850,916 B1 | 2/2005 | Wang |
| 6,877,093 B1 | 4/2005 | Desai et al. |
| 6,904,415 B2 | 6/2005 | Krahn et al. |
| 6,947,768 B2 | 9/2005 | Adachi et al. |
| 6,983,167 B2 | 1/2006 | Adachi et al. |
| 7,017,188 B1 | 3/2006 | Schmeidler et al. |
| 7,028,097 B2 | 4/2006 | Bard |
| 7,046,647 B2 | 5/2006 | Oba et al. |
| 7,103,333 B2 | 9/2006 | Lazaridis et al. |
| 7,120,559 B1 | 10/2006 | Williams et al. |
| 7,149,308 B1 | 12/2006 | Fruehauf et al. |
| 7,181,530 B1 | 2/2007 | Halasz et al. |
| 7,197,647 B1 | 3/2007 | Van Essen et al. |
| 7,254,367 B2 | 8/2007 | Helden et al. |
| 7,263,105 B2 | 8/2007 | Trainin |
| 7,269,260 B2 | 9/2007 | Adachi et al. |
| 7,277,729 B2 | 10/2007 | Adachi et al. |
| 7,284,062 B2 | 10/2007 | Krantz et al. |
| 7,286,515 B2 | 10/2007 | Olson et al. |
| 7,299,063 B2 | 11/2007 | Kurihara |
| 7,302,256 B1 | 11/2007 | O'Hara et al. |
| 7,324,805 B2 | 1/2008 | Nakakita et al. |
| 7,327,690 B2 | 2/2008 | Billhartz |
| 7,328,451 B2 | 2/2008 | Aaron |
| 7,353,381 B2 | 4/2008 | Sheth et al. |
| 7,363,022 B2 | 4/2008 | Whelan et al. |
| 7,398,550 B2 | 7/2008 | Zick et al. |
| 7,421,503 B1 | 9/2008 | Stieglitz et al. |
| 7,430,181 B1 | 9/2008 | Hong |
| 7,430,195 B2 | 9/2008 | Utsunomiya et al. |
| 7,508,801 B1 | 3/2009 | Calhoun |
| 7,512,689 B2 | 3/2009 | Saint-Hilaire et al. |
| 7,516,025 B1 | 4/2009 | Williams et al. |
| 7,523,209 B1 | 4/2009 | Treichler et al. |
| 7,636,338 B1 | 12/2009 | Vu et al. |
| 7,930,737 B2 * | 4/2011 | Thawani et al. ............... 726/11 |
| 2001/0032318 A1 | 10/2001 | Yip et al. |
| 2002/0035699 A1 | 3/2002 | Crosbie |
| 2002/0061748 A1 | 5/2002 | Nakakita et al. |
| 2002/0062451 A1 | 5/2002 | Scheidt et al. |
| 2002/0077077 A1 | 6/2002 | Rezvani et al. |
| 2002/0114453 A1 | 8/2002 | Bartholet et al. |
| 2002/0196764 A1 | 12/2002 | Shimizu |
| 2003/0012149 A1 | 1/2003 | Maggenti |
| 2003/0018889 A1 | 1/2003 | Burnett |
| 2003/0036404 A1 | 2/2003 | Adachi et al. |
| 2003/0064752 A1 | 4/2003 | Adachi et al. |
| 2003/0078072 A1 | 4/2003 | Serceki et al. |
| 2003/0119484 A1 | 6/2003 | Adachi et al. |
| 2003/0131082 A1 | 7/2003 | Kachi |
| 2003/0188006 A1 | 10/2003 | Bard |
| 2003/0212768 A1 | 11/2003 | Sullivan |
| 2003/0212889 A1 | 11/2003 | Khieu et al. |
| 2003/0217289 A1 | 11/2003 | Ammon et al. |
| 2004/0019789 A1 | 1/2004 | Buer |
| 2004/0028001 A1 | 2/2004 | Billhartz |
| 2004/0039526 A1 | 2/2004 | Inbar et al. |
| 2004/0111520 A1 | 6/2004 | Krantz |
| 2004/0117466 A1 | 6/2004 | Bodin et al. |
| 2004/0120292 A1 | 6/2004 | Trainin |
| 2004/0136745 A1 | 7/2004 | Sato et al. |
| 2004/0168081 A1 | 8/2004 | Ladas et al. |
| 2004/0198319 A1 | 10/2004 | Whelan et al. |
| 2004/0203590 A1 | 10/2004 | Shteyn |
| 2004/0203941 A1 | 10/2004 | Kaplan et al. |
| 2004/0215957 A1 | 10/2004 | Moineau et al. |
| 2004/0242197 A1 | 12/2004 | Fontaine et al. |
| 2004/0249977 A1 | 12/2004 | Minamisawa |
| 2004/0264395 A1 * | 12/2004 | Rao ............................... 370/311 |
| 2004/0264429 A1 | 12/2004 | Tatara |
| 2004/0268150 A1 | 12/2004 | Aaron |
| 2005/0005013 A1 | 1/2005 | Saint-Hilaire et al. |
| 2005/0014503 A1 | 1/2005 | Nakakita et al. |
| 2005/0071426 A1 | 3/2005 | Shah |
| 2005/0078624 A1 | 4/2005 | Shu et al. |
| 2005/0086465 A1 | 4/2005 | Sapkota et al. |
| 2005/0086466 A1 | 4/2005 | Funnell et al. |
| 2005/0097315 A1 * | 5/2005 | Carmeli ......................... 713/160 |
| 2005/0114682 A1 | 5/2005 | Zimmer et al. |
| 2005/0136925 A1 | 6/2005 | Yamauchi |
| 2005/0147071 A1 | 7/2005 | Karaoguz et al. |
| 2005/0160138 A1 | 7/2005 | Ishidoshiro |
| 2005/0163078 A1 | 7/2005 | Oba et al. |
| 2005/0193103 A1 | 9/2005 | Drabik |
| 2005/0198643 A1 | 9/2005 | Lachelt et al. |
| 2005/0226175 A1 | 10/2005 | Gupta et al. |
| 2005/0245237 A1 | 11/2005 | Adachi et al. |
| 2005/0276417 A1 | 12/2005 | Funnell |
| 2005/0286075 A1 | 12/2005 | Ryu et al. |
| 2006/0013184 A1 | 1/2006 | Utsunomiya et al. |
| 2006/0014536 A1 | 1/2006 | Demirhan et al. |
| 2006/0040656 A1 | 2/2006 | Kotzin |
| 2006/0040709 A1 | 2/2006 | Adachi et al. |
| 2006/0173844 A1 | 8/2006 | Zhang et al. |
| 2006/0184794 A1 | 8/2006 | Desselle et al. |
| 2007/0077936 A1 | 4/2007 | Tomisawa et al. |
| 2007/0171870 A1 | 7/2007 | Oba et al. |
| 2007/0247366 A1 | 10/2007 | Smith et al. |
| 2008/0004076 A1 | 1/2008 | Adachi et al. |
| 2008/0292101 A1 | 11/2008 | Macchi |
| 2008/0295144 A1 | 11/2008 | Cam-Winget et al. |
| 2009/0022152 A1 | 1/2009 | Henry et al. |

OTHER PUBLICATIONS

IEEE St. 802.1X—2004 "IEEE Standard for Local and metropolitan area networks: Port-Based Network Access Control," pp. 1-51, Dec. 13, 2004.

Jim Geier "802.11 Beacons Revealed"; indexed by web.archive.org on Apr. 17, 2003; downloaded from http://web.archive.org/web/20030417014958/http://www.80211-planet.com/tutorials/article.php/1492071 on Nov. 29, 2010.

Derek Cheung (i.e., Cheung), "WLAN Security & Wi-Fi Protected Access," Dr. Dobb's Journal, Jun. 1, 2004.

Lan Man, Standards Committee of the IEEE Computer Society, ANS/IEEE Std. 802.11, Part 11: Wireless LAN Medium Access Control (MAC) and Physical Layer (PHY) Specifications, 1999 Edition (R2003), pp. 9-65.

* cited by examiner

METHOD AND SYSTEM FOR IMPROVED COMMUNICATION NETWORK SETUP UTILIZING EXTENDED TERMINALS

CROSS-REFERENCE TO RELATED APPLICATIONS/INCORPORATION BY REFERENCE

This application is a continuation of U.S. application Ser. No. 11/208,347 filed Aug. 18, 2005, which makes reference to, claims priority to, and claims the benefit of U.S. Provisional Application Ser. No. 60/602,396 filed Aug. 18, 2004, and U.S. Provisional Application Ser. No. 60/671,120 filed Apr. 14, 2005.

This application also makes reference to:
U. S. application Ser. No. 11/207,302 filed Aug. 18, 2005;
U. S. application Ser. No. 11/207,262 filed Aug. 18, 2005, now U.S. Pat. No. 7,653,036 issued Jan. 26, 2010;
U. S. application Ser. No. 11/207,658 filed Aug. 18, 2005;
U. S. application Ser. No. 11/208,081 filed Aug. 18, 2005;
U. S. application Ser. No. 11/208,310 filed Aug. 18, 2005;
U. S. application Ser. No. 11/208,275 filed Aug. 18, 2005;
U. S. application Ser. No. 11/208,346 filed Aug. 18, 2005;
U. S. application Ser. No. 11/207,661 filed Aug. 18, 2005;
U. S. application Ser. No. 11/207,301 filed Aug. 18, 2005, now U.S. Pat. No. 7,343,411 issued Mar. 11, 2008; and
U. S. application Ser. No. 11/208,284 filed Aug. 18, 2005.

Each of the above referenced applications is hereby incorporated herein by reference in its entirety.

FIELD OF THE INVENTION

Certain embodiments of the invention relate to wireless network communication. More specifically, certain embodiments of the invention relate to a method and system for improved communication network setup utilizing extended terminals.

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a station (STA) to associate to an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for improved communication network setup utilizing extended terminals substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
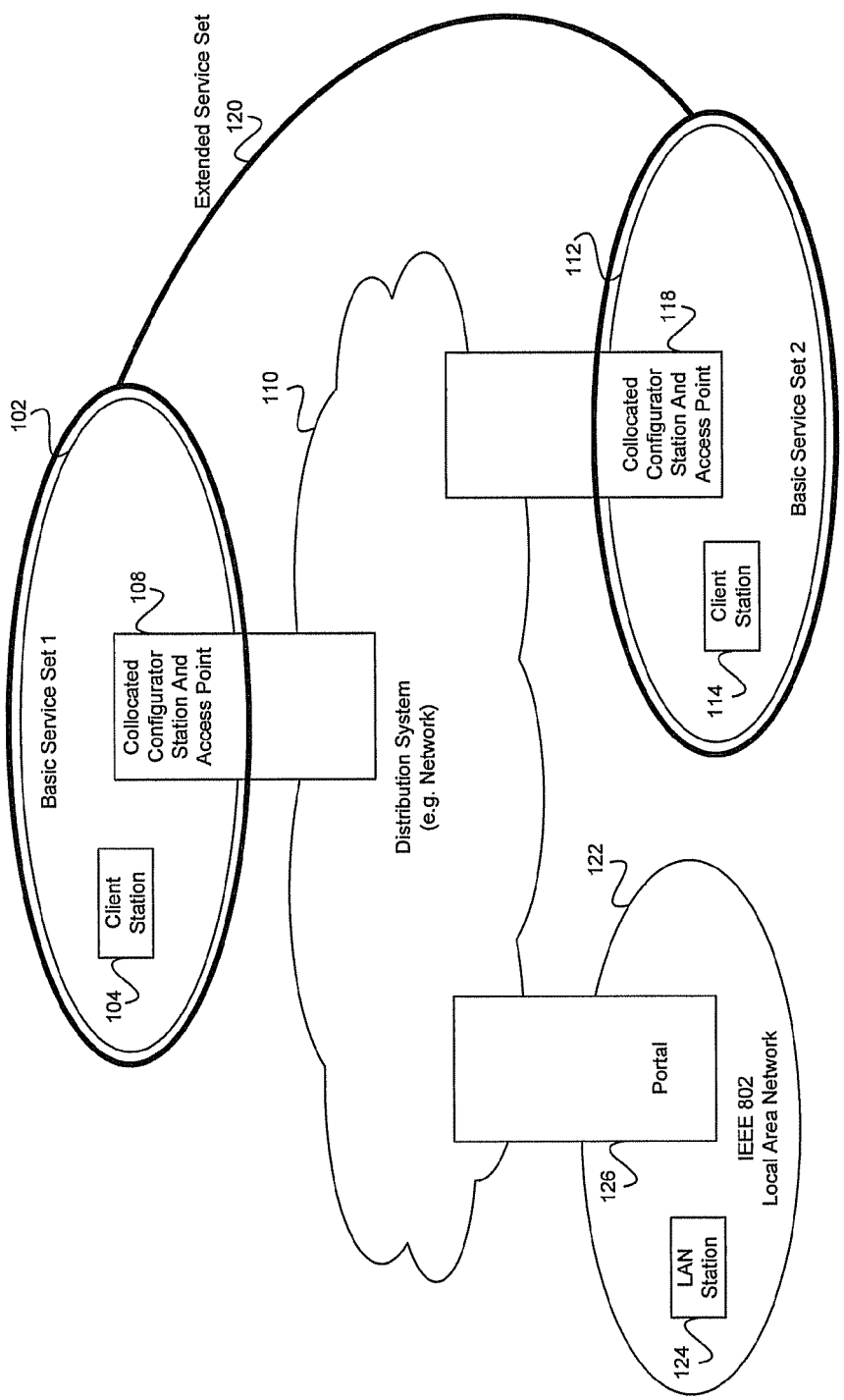
FIG. 1 is a block diagram of an exemplary system for wireless data communications comprising an ESS with collocation of configurators and access points (AP), in accordance with an embodiment of the invention.

Certain embodiments of the invention may be found in a method and system for improved communication network setup utilizing extended terminals. Aspects of the invention may comprise configuring a wireless Ethernet terminal functioning as a client station by a configurator via a network. The configured wireless Ethernet terminal may wirelessly receives information from a wireless station, and communicate the wirelessly received information to at least one of a plurality of wired stations via at least one of a plurality of corresponding wired interfaces. Aspects of the system may comprise a collocated device functioning as a configurator that configures a wireless Ethernet terminal functioning as a client station via a network. The configured wireless Ethernet terminal may wirelessly receives information from a wireless station, and communicate the wirelessly received information to at least one of a plurality of wired stations via at least one of a plurality of corresponding wired interfaces.

In IEEE 802.11 wireless local area network (WLAN) systems, wireless terminal devices, or wireless terminals, for example personal computers or personal digital assistants, may communicate via radio frequency (RF) channels that may be monitored by unauthorized parties at terminal devices that were not intended to participate in the communication. In response, IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Enabling a wireless terminal device to obtain authorization and to utilize encryption may require a user to manually configure the wireless terminal. This manual configuration may require a user to possess extensive knowledge about the WLAN that may exceed that of a typical WLAN user. An aspect of the invention may comprise a method that reduces user interaction and knowledge required to configure a wireless terminal for secure communications in an IEEE 802.11 wireless local area network (WLAN). Components in a system, in accordance with an embodiment of the invention, may comprise a configurator, which may alternatively be referred to as a configurator terminal, configurator device, or configurator station, and a client, which may be alternatively referred to as a client terminal, client device, or client station. A configurator station, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure clients, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN.

FIG. 1 is a block diagram of an exemplary system for wireless data communications comprising an ESS with collocation of configurators and access points (AP), in accordance with an embodiment of the invention. With reference to FIG. 1 there is shown a distribution system (DS) 110, an extended service set (ESS) 120, and an IEEE 802 LAN 122. The ESS 120 may comprise a first basic service set (BSS) 102, and may include a second BSS 112, and may also include additional BSSs. The first BSS 102 may comprise a client station 104, and a collocated configurator station and access point 108. The second BSS 112 may comprise a client station 114, and a collocated configurator station and access point 118. The IEEE 802 LAN 122 may comprise a LAN station 124, and a portal 126.

The collocated configurator station and access point 108 may be adapted to function as an access point or as a configurator station. Throughout this application, for simplicity, collocated configurator station and access point 108 may be referred to as collocated device 108. Accordingly, the collocated device 108 functioning as an access point refers to the collocated configurator station and access point 108 functioning as an access point. Additionally, the collocated device 108 functioning as a configurator refers to the collocated configurator station and access point 108 functioning as a configurator.

A BSS 102 may comprise a plurality of proximately located stations that may communicate wirelessly, via a wireless medium. A BSS 102 that is also associated with an ESS 120 may be referred to an infrastructure BSS. The wireless medium may comprise an RF channel. The ESS 120, comprising a plurality of BSS 102 and 112, for example, may be identified by a unique service set identifier (SSID). The portal 126 may also be a member in the ESS 120. Stations 104 and 114, associated with an ESS 220, respectively, may communicate via a wireless medium and/or via a distribution system medium, for example the DS 110. The DS 110 may comprise a distribution system medium that further comprises a wired medium and/or a wireless medium. A wired medium may comprise a physical communications channel that enables STA 104 to transmit information via a plurality of communications technologies, for example electrical or optical signals. In an IEEE 802.11 WLAN, the collocated configurator station and access point 108 or 118 may comprise the functionality of an AP and the functionality of a configurator. In an IEEE 802.11 WLAN, an AP may comprise the functionality of a station.

The collocated device 108 functioning as an AP, may enable STA 104 to transmit information via the DS 110. Portal 126 may enable a LAN station 124, which is located in a traditional IEEE 802 LAN, to communicate with an IEEE 802.11 STA 104, via the DS 110. A traditional IEEE 802 LAN may comprise a wired medium. An IEEE 802 LAN 122 may not comprise an IEEE 802.11 WLAN, for example BSS 102. The DS 110 may utilize media access control (MAC) layer IEEE 802 addressing and/or network layer addressing. If the DS 110 utilizes MAC layer IEEE 802 addressing, the collocated device 108 functioning as an AP, collocated configurator station and access point 118 functioning as an AP, and/or the portal 126 may comprise Ethernet switching device functionality. If the DS 110 utilizes network layer addressing, the collocated device 108 functioning as an AP, collocated configurator station and access point 118 functioning as an AP, and/or the portal 126 may comprise router functionality.

The collocated device 108 functioning as a configurator may configure a STA 104, thereby enabling the STA 104 to communicate wirelessly in a secure IEEE 802.11 network that utilizes encryption. The collocated device 108 functioning as a configurator, may configure a STA 104 by communicating information to the STA 104 comprising an SSID and an encryption key. The encryption key may also be referred to as a passphrase. A configured STA 104 may be authorized to utilize an IEEE 802.11 network based on the received configuration information from the collocated device 108 functioning as a configurator. A process by which the STA 104 is authenticated may comprise configuration of the STA 104. Various embodiments of the invention comprise a method and a system for configuring the STA 104 while requiring less manual intervention from a user than is the case with some conventional methods and/or systems for configuring the STA 104.

A non-AP station, for example, the client station 104 within the BSS 102 may subsequently form an association with the collocated device 108 functioning as an AP. The STA 104 may communicate an association request to the collocated device 108 functioning as an AP, based on the SSID that was received by the STA 104 during configuration. The collocated device 108 functioning as an AP, may communicate an association response to the STA 104 to indicate to the STA 104 the result of the association request. By associating with the collocated device 108 functioning as an AP, the station 104 may become a member of BSS 102. Furthermore, by obtaining membership in BSS 102, the STA 104 may become authorized to engage in secure wireless communication with other client stations in the ESS 120. Similarly, non-AP client station 114 within a BSS 112 may form an association with the collocated configurator station and access point 118 functioning as an AP, enabling the STA 114 to become a member of BSS 112.

Subsequent to the formation of an association between the client station 104 and the collocated device 108 functioning as an AP, the collocated device 108 functioning as an AP, may communicate accessibility information about the client station 104 to other APs associated with the ESS 120, such as the collocated configurator station and access point 118 functioning as an AP, and portals such as the portal 126. In turn, the collocated configurator station and access point 118 functioning as an AP, may communicate accessibility information about the client station 104 to stations in BSS 112. The portal 126, such as for example an Ethernet switch or other device in a LAN, may communicate reachability information about the client station 104 to stations in LAN 122, such as LAN station 124. The communication of reachability information about the client station 104 may enable stations that are not associated in BSS 102, but are associated in ESS 120, to communicate with the client station 104.

The DS 110 may provide an infrastructure that enables a client station 104 in one BSS 102, which has been authenticated and configured in accordance with various embodiments of the invention, to engage in a secure wireless communication with a client station 114 in another BSS 112. The DS 110 may also enable a client station 104 in one BSS 102 to communicate with a LAN station 124 in a non-802.11 LAN 122, such as a wired LAN. The collocated device 108 functioning as an AP, collocated configurator station and access point 118 functioning as an AP, or portal 126 may provide a facility by which a station in a BSS 102, BSS 112, or LAN 122 may communicate information via the DS 110. The client station 104 in BSS 102 may communicate information to a client station 114 in BSS 112 by transmitting the information to collocated device 108 functioning as an AP. The collocated device 108 functioning as an AP may transmit the information via the DS 110 to the collocated configurator station and access point 118 functioning as an AP, which, in turn, may transmit the information to station 114 in BSS 112. The client station 104 may communicate information to a LAN station 124 in LAN 122 by transmitting the information to collocated device 108 functioning as an AP. The collocated device 108 functioning as an AP, may transmit the information via the DS 110 to the portal 126, which, in turn, may transmit the information to the LAN station 124 in LAN 122.

In some conventional networks, a wired LAN station 124 and a wireless client station 104 may communicate via a portal 126, DS 110, and/or collocated device 108 functioning as an AP. Various embodiments of the invention may comprise a method and a system by which a wired LAN station 124 and a wireless client station 104 may communicate via a wireless Ethernet terminal (WET) device. The WET may be a member of a common BSS 102 with the client station 104. The WET may communicate with the client station 104 via an RF channel. The WET may communicate with the LAN station 124 via a wired interface.

Figure 2A:
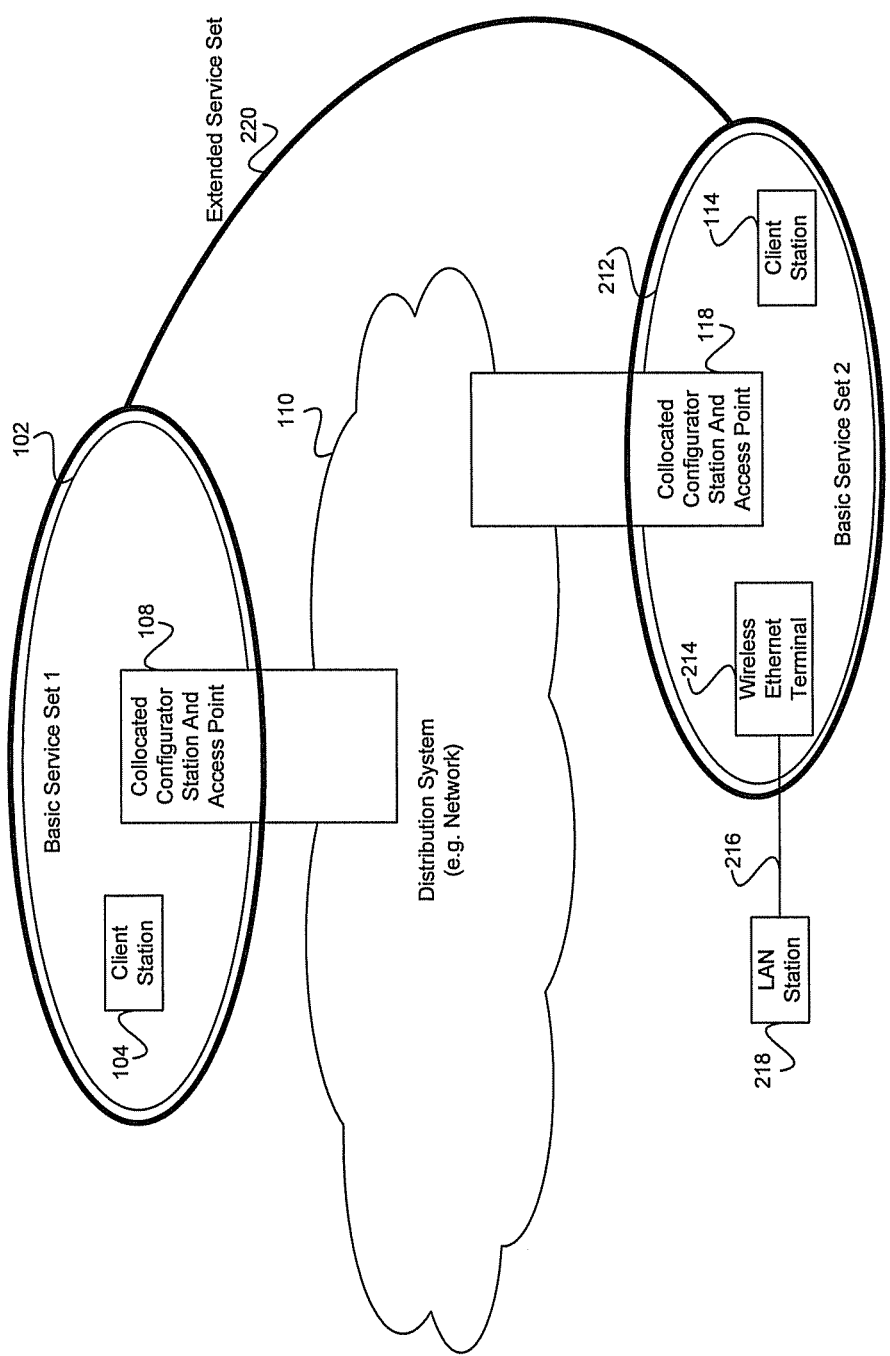
FIG. 2a is a block diagram of an exemplary system for wireless data communications comprising a BSS with extended terminals via a wireless Ethernet terminal, in accordance with an embodiment of the invention.

FIG. 2a is a block diagram of an exemplary system for wireless data communications comprising a BSS with extended terminals via a wireless Ethernet terminal, in accordance with an embodiment of the invention. With reference to FIG. 2a there is shown a DS 110, an ESS 120, a LAN station 218, and a wired interface 216. The ESS 220 may comprise a BSS 102, a BSS 212, and may also include additional BSSs. The BSS 102 may comprise a client station 104, and a collocated configurator station and access point 108. The BSS 212 may comprise a client station 114, a collocated configurator station and access point 118, and a wireless Ethernet terminal (WET) 214.

The WET 214 may comprise functionality of a client station 104 within the BSS 212. The WET 214 functioning as a client station may be configured by a collocated device 118 functioning as a configurator, in accordance with various embodiments of the invention. The WET 214 functioning as an Ethernet LAN terminal device may communicate with a wired LAN station 218, via a wired interface 216. The wired interface 216 may be coupled to a port that is located at the WET 214. The WET 214 functioning as an Ethernet LAN terminal device may comprise a plurality of ports, wherein a subsequent port that is located at the WET 214 may be coupled to a subsequent wired interface 216. The subsequent wired interface 216 may be utilized to communicate with a subsequent LAN station 218. The WET 214 functioning as a client station, located within the BSS 212, may communicate with a client station 114, also located within the BSS 212, via an RF channel. The WET 214 may enable the LAN station 218 to communicate with the client station 114 without utilizing a portal 126, a DS 110, and/or collocated device 118 functioning as an access point.

U. S. application Ser. No. 11/207,302 filed Aug. 18, 2005, provides a detailed description of procedures by which a collocated device 118 functioning as a configurator may configure a wireless Ethernet terminal 214 functioning as a client station, and is hereby incorporated by reference in its entirety.

The WET 214 functioning as an Ethernet LAN terminal device may be coupled to a plurality of LAN stations 218, via a corresponding plurality of wired interfaces 216. A client station 114 and/or collocated device 118 that communicates information to any of the plurality of LAN stations 218 may communicate information to the WET 214. The destination for the information may be a LAN station 218 among a plurality of LAN stations that may be communicatively coupled to the WET 214. Ethernet frames, comprising information to be communicated by the client station 114 and/or collocated device 118 to any of the plurality of LAN stations 218 may utilize an address consistent with an addressing scheme utilized within the BSS 212 associated with the WET 214.

The Ethernet frame received via an RF channel within a BSS 212 may utilize an IEEE 802.11 compliant frame format, for example. This received frame may be referred to as a WLAN frame and may comprise a destination address field that corresponds to an Ethernet address, or media access control (MAC) address, that is associated with the WET 214. The WLAN frame may comprise a physical layer header field and a physical layer service data unit (PSDU) field as defined in IEEE standard 802. The header field may comprise one or more WLAN MAC addresses, for example a source WLAN MAC address and a destination WLAN MAC address. The PSDU field may comprise information associated with a higher layer protocol, for example the Internet Protocol (IP), as specified by International Organization for Standardization's (ISO's) protocol reference model (PRM).

The WET 214 may utilize information contained in the PSDU to determine a MAC address associated with one of the plurality of LAN stations 218 that are coupled to the WET 214 via a wired interface 216, for example. The MAC address may be associated with a port located at the WET 214 that is coupled to a corresponding wired interface 216. The WET 214 may generate, and append, a suitable physical layer header to the WLAN frame PSDU that comprises the MAC address associated with the LAN station 218 to which the WET 214 may transmit the received Ethernet frame via the wired interface 216. An Ethernet frame that may be transmitted via a wired interface 216 may utilize a frame format suitable for a LAN in accordance with IEEE standard 802.3, for example. The transmitted frame may be referred to as a LAN frame. The WET 214 may subsequently transmit LAN frame to the LAN station 218 via the wired interface 216.

A LAN station 218 may communicate information to a client station 114 and/or collocated device 118 via the WET 214. LAN frames, comprising the information to be communicated to the client station 114 and/or collocated device 118 may utilize an address consistent with the addressing scheme utilized within a wired LAN 122 that is associated with the client station 114 and/or collocated device 118. The WET 214 may generate, and append, a suitable physical layer header to the LAN frame PSDU. The WET 214 may transmit the resulting WLAN frame within the BSS 212 via an RF channel. A process by which a WET may convert a WLAN frame header to a LAN frame header, and/or convert a LAN frame header to a WLAN frame header may be referred to as transcoding.

In various embodiments of the invention, a plurality of LAN stations 218 may communicate with a client station 114 and/or collocated device 118 via the wired Ethernet terminal 214. The WET 214 may enable a BSS 212 communication with wired LAN stations 218 without utilizing an intermediate portal 126, DS 110 and/or the collocated device 118 functioning as an AP. Consequently, the WET 214 may extend the BSS 212 to incorporate wired LAN stations 218. The plurality of LAN stations 218 may communicate with the client station 114 and/or collocated device 118 utilizing a single MAC address, for example. The MAC address, for example, may be associated with the WET 214 among client stations 114 and/or collocated devices 118, which may be located within the ESS 220. Consequently, the plurality of LAN stations 218 may appear to be a single station among client stations 114 and/or collocated devices 118, which may be located within the ESS 220. The WET 214 may distinguish one of the LAN stations 218, which is a destination for a received WLAN frame based on higher layer information contained within the WLAN frame. The WET 214 may associate a port, located at the WET 214, with an address that is associated with a LAN station 218 among the plurality of LAN stations 218. The port may be coupled to a wired interface 216 that may be utilized to communicate information to the LAN station 218 among the plurality of LAN stations 218.

Figure 2B:
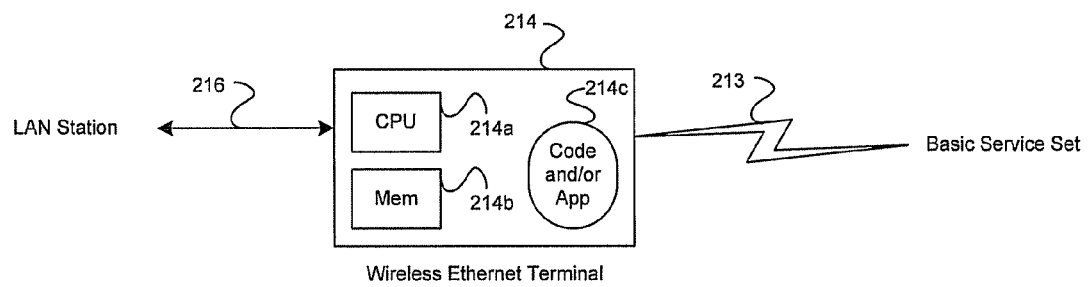
FIG. 2b is a block diagram for a software environment in an exemplary wireless Ethernet terminal, which may be utilized in connection with an embodiment of the invention.

FIG. 2b is a block diagram for a software environment in an exemplary wireless Ethernet terminal, which may be utilized in connection with an embodiment of the invention. Referring to FIG. 2b, there is shown a WET 214, a wired interface 216, and an RF channel 213. The WET 214 may further comprise a central processing unit (CPU) 214a, system memory 214b, and code and/or application software 214c. The wired interface 216 may be utilized by the WET 214 to communicate information to and/or from a LAN station 218. The RF channel 213 may be utilized by the WET 214 to communicate information to and/or from a client station 114 and/or collocated device 118, which may be located in a common BSS 212 with the WET 214. The WET 214 may be substantially as described with regard to FIG. 2a.

The CPU 214a may be adapted to perform digital receiver and/or transmitter functions in accordance with applicable communications standards. These functions may comprise, but are not limited to, tasks performed at lower layers in a relevant PRM. These tasks may further comprise the physical layer convergence procedure (PLCP), physical medium dependent (PMD) functions, and associated layer management functions. The system memory 214b may comprise suitable logic, circuitry, and/or code to be utilized to store, or write, and retrieve, or read, information. The system memory 214b may comprise a plurality of memory technologies such as random access memory (RAM). The code and/or applications software 214c may comprise a computer program.

In operation, the system memory 214b may comprise machine-readable storage having stored thereon at least one code section for enabling communication of information in a secure communication system. The at least one code section may be executable by the CPU 214a. The at least one code section may cause the CPU 214a to perform steps related to extending a BSS 212 to incorporate wired LAN stations 218.

Figure 3:
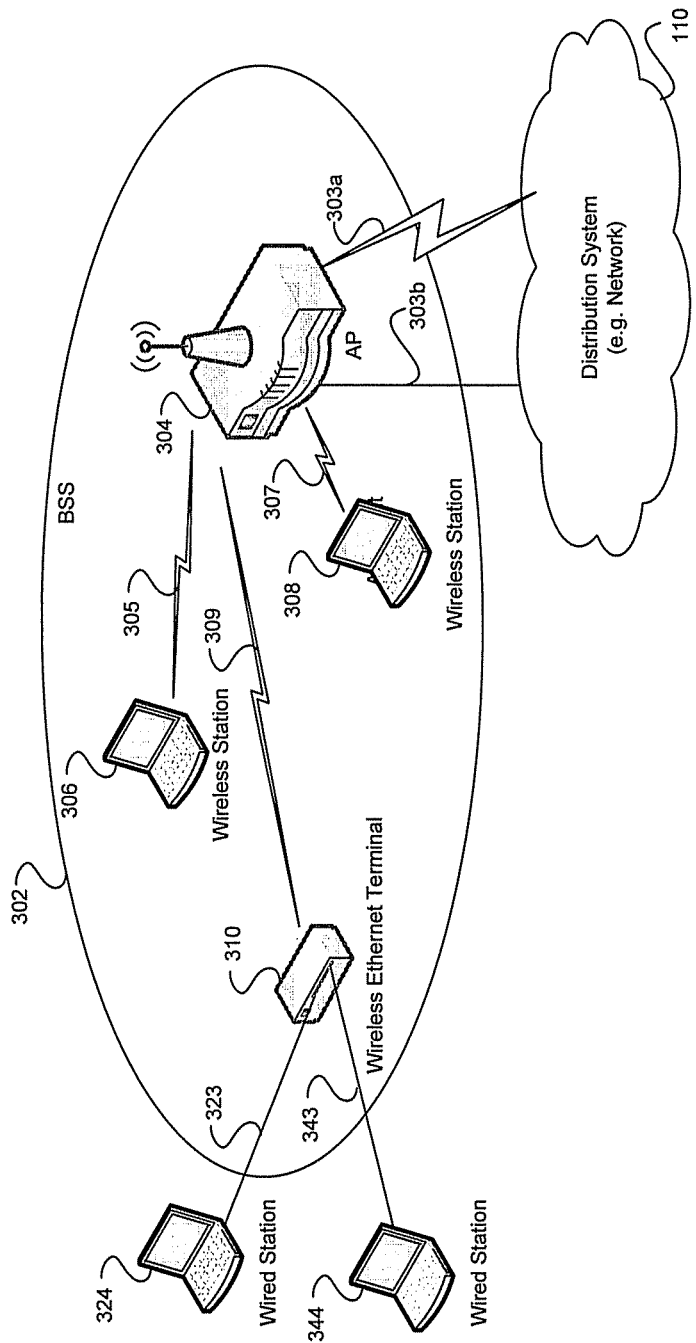
FIG. 3 is a block diagram of an exemplary basic service set environment that comprises a wireless Ethernet terminal, in accordance with an embodiment of the invention.

FIG. 3 is a block diagram of an exemplary basic service set environment that comprises a wireless Ethernet terminal, in accordance with an embodiment of the invention. Referring to FIG. 3, there is shown a BSS 302, a DS 110, and a plurality of wired stations 324 and 344. The BSS 302 may comprise an AP 304, a plurality of wireless stations 306 and 308, a wireless Ethernet terminal (WET) 310, a plurality of RF channels 303a, 305, 307 and 309, and a plurality of wired interfaces 303b, 323 and 343. The wired stations 324 and 344 may be substantially as described with respect to the LAN station 124 of FIG. 1. The plurality of wireless stations 306 and 308 may be substantially as described with respect to the client station 104 of FIG. 1. The WET 310 may be substantially as described with respect to the WET 214 of FIG. 2a. The AP 304 may be substantially as described with respect to the collocated device 108 functioning as an access point of FIG. 1.

The AP 304 may communicate information to the DS 110 via a wired interface 303b and/or a wireless interface 303a. The wireless station 306 may communicate information wirelessly within the BSS 302 via an RF channel 305. The wireless station 308 may communicate information wirelessly within the BSS 302 via an RF channel 307. The WET 310 may communicate information wirelessly within the BSS 302 via an RF channel 309. The WET 310 may communicate information to the wired station 324 via the wired interface 323. The wired interface 323 may be coupled to a port located at the WET 310. The WET 310 may communicate information to the wired station 344 via the wired interface 343. The wired interface 343 may be coupled to a port located at the WET 310.

In operation, the wireless station 306 may communicate information to a wireless station 308 located in a common BSS 302 with the wireless station 306. The wireless station 306 may generate a WLAN frame that indicates a destination address that corresponds to an address within the BSS 302, which is associated with the wireless station 308. The wireless station 306 may communicate the generated WLAN frame to the wireless station 308 via an RF channel 305. The wireless station 308 may receive the transmitted WLAN frame via an RF channel 307.

The wireless station 306 may communicate information to a wired station 324 that is communicatively coupled to the WET 310. The WET 310 may be located in a common BSS 302 with the wireless station 306. The wireless station 306 may generate a WLAN frame that indicates a destination address that corresponds to an address within the BSS 302 that is associated with the WET 310. The wireless station 306 may communicate the generated WLAN frame to the WET 310 via the RF channel 305. The WET 310 may receive the transmitted WLAN frame via an RF channel 309. The WET 310 may decrypt the received WLAN frame. The WET 310 may inspect the decrypted WLAN frame PSDU. Based on this inspection, the WET 310 may determine a LAN MAC address that may be associated with the wired station 324. The WET 310 may transcode the WLAN header into a LAN header.

Subsequent to transcoding, a LAN frame header may indicate a destination address that corresponds to an address within a LAN 122 that is associated with wired station 324. The WET 310 may generate a LAN header based on transcoding of the WLAN header. The WET 310 may generate a LAN frame that may be communicated to the wired station 324. The LAN frame may comprise the LAN frame header and at least a portion of the decrypted WLAN frame PSDU. The WET 310 may determine a port, which is located at the WET 310, which is associated with the LAN MAC address that may be associated with the wired station 324. The WET 310 may identify a wired interface 323, which is located at the WET 310, which may be communicatively coupled to the port. The WET 310 may transmit the LAN frame to the wired station 324 via the wired interface 323. The wired station 324 may receive the transmitted LAN frame via the wired interface 323.

The wired station 324 may communicate information to a wireless station 306 that is communicatively coupled to the WET 310. The WET 310 may be located in a common BSS 302 with the wireless station 306. The wired station 324 may generate a LAN frame indicating a destination address that corresponds to an address within the BSS 302 that is associated with the wireless station 306. The wired station 324 may communicate the generated LAN frame to the WET 310 wired interface 323. The WET 310 may receive the transmitted LAN frame via the wired interface 323. The WET 310 may inspect the LAN frame header and may transcode the LAN header to generate a WLAN frame header. The WET 310 may generate a WLAN frame comprising the generated WLAN header and at least a portion of the received LAN frame PSDU. The WET 310 may encrypt the generated WLAN frame and the resulting encrypted WLAN frame may be communicated to the wireless station 306 via the RF channel 309. The encrypted WLAN frame may be received by the wireless station 306 via the RF channel 305.

Figure 4:
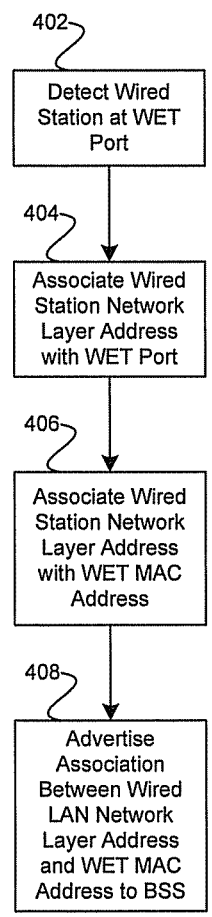
FIG. 4 is a flowchart illustrating exemplary steps by which a wireless Ethernet terminal may detect a wired station, in accordance with an embodiment of the invention.

FIG. 4 is a flowchart illustrating exemplary steps by which a wireless Ethernet terminal may detect a wired station, in accordance with an embodiment of the invention. Referring to FIG. 4, in step 402, a WET 310 may detect a wired station 324 at a port located at the WET 310. In step 404, the WET 310 may associate a network layer address with the wired station 324 at the port located at the WET 310 at which the wired station 324 was detected, for example. In step 406, the WET 310 may associate a MAC layer address with the wired station 324 at the port located at the WET 310 at which the wired station 324 was detected, for example.

In step 408, the WET 310 may advertise a network layer address, for example, of the wired station 324 within the BSS 302. The WET 310 may also advertise an association between the network layer address of the wired station 324, and/or the MAC layer address of the WET 310 within the BSS 302, for example. The WET 310 may advertise this association within the BSS 302 in accordance with procedures specified in IEEE standard 802.11. Also in step 402, a wired station 324 or 344 may be authenticated by a configured WET 310 functioning as an Ethernet LAN terminal device. The authentication may be performed by manual configuration, or based on a protocol, for example as specified in the IEEE standard 802.1X.

Figure 5:
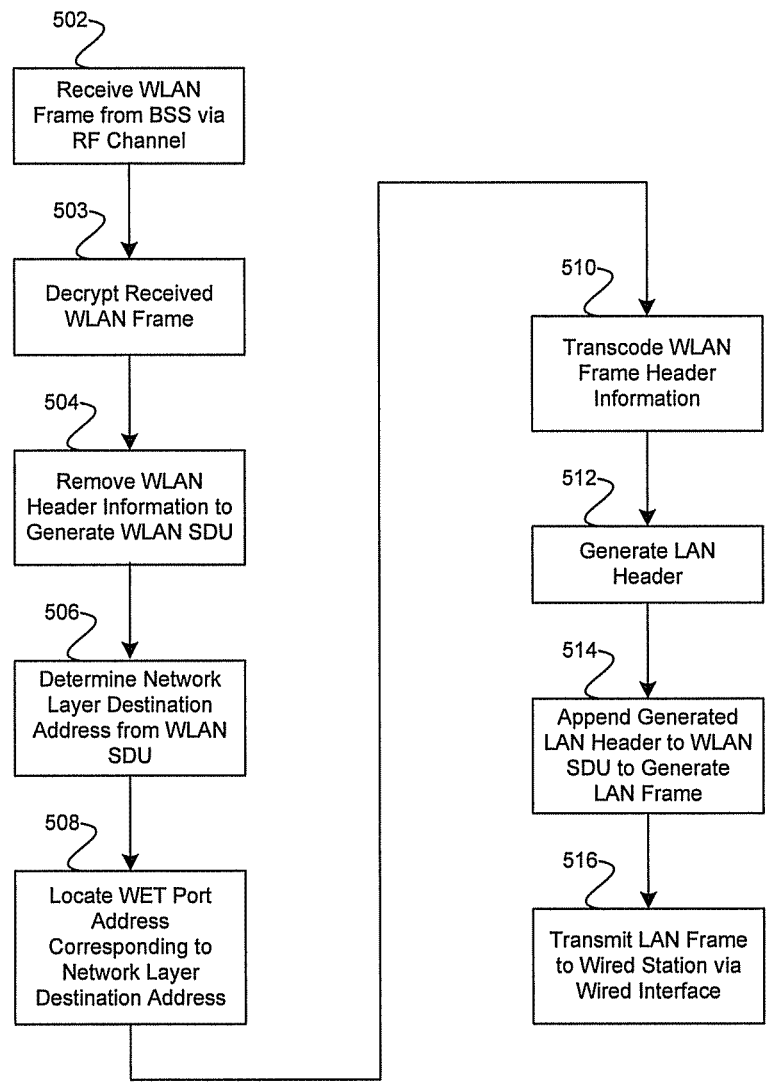
FIG. 5 is a flowchart illustrating exemplary steps by which a wireless Ethernet terminal may communicate information received from a wireless terminal to a wired terminal, in accordance with an embodiment of the invention.

FIG. 5 is a flowchart illustrating exemplary steps by which a wireless Ethernet terminal may communicate information received from a wireless terminal to a wired terminal, in accordance with an embodiment of the invention. Referring to FIG. 5, in step 502, the WET 310 may receive a WLAN frame from a wireless station 306 via an RF channel 309. In step 503, the WET 310 may decrypt the received WLAN frame. In step 504, the WET 310 may remove the WLAN header information from the decrypted received WLAN frame to generate a WLAN PSDU. In step 506, the WET 310 may determine a network layer destination address from the WLAN PSDU. In step 508, the WET 310 may locate a WET port address corresponding to the network layer destination address. In step 510, the WET 310 may transcode the WLAN frame header information. The trancoding may comprise translating the header format from a WLAN header format to a LAN header format, for example. In step 512, the WET 310 may generate a LAN header. In step 514, the generated LAN header may be appended to at least a portion of the WLAN PSDU to generate a LAN frame. In step 516, the LAN frame may be transmitted via a wired interface 323 to the wired station 324.

Figure 6:
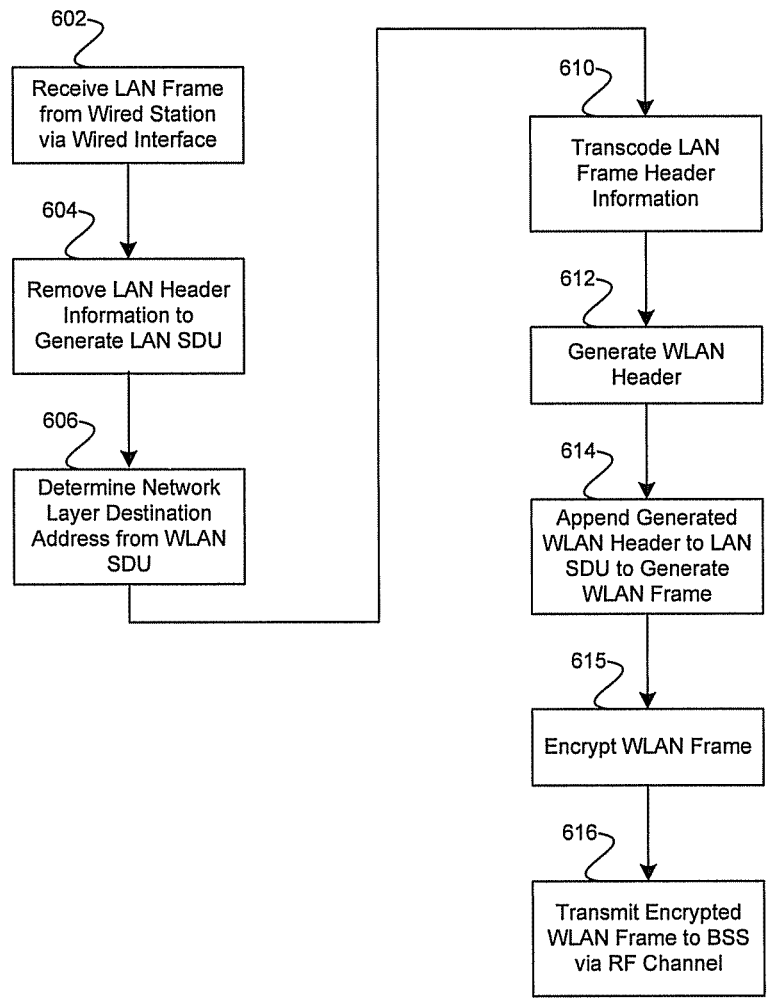
FIG. 6 is a flowchart illustrating exemplary steps by which a wireless Ethernet terminal may communicate information received from a wired terminal to a wireless terminal, in accordance with an embodiment of the invention.

FIG. 6 is a flowchart illustrating exemplary steps by which a wireless Ethernet terminal may communicate information received from a wired terminal to a wireless terminal, in accordance with an embodiment of the invention. Referring to FIG. 6, in step 602, the WET 310 may receive a LAN frame from a wired station 324 via a wired interface 323. In step 604, the WET 310 may utilize the LAN header information from the received LAN frame to generate a LAN PSDU. In step 606, the WET 310 may determine a network layer destination address from the LAN PSDU. In step 610, the WET 310 may transcode the LAN frame header information. The transcoding may comprise translating the header format from a WLAN header format to a LAN header format, for example. The WET 310 may associate a network layer destination address in the received LAN header with a MAC address that is associated with the collocated device 304 functioning as an AP within the common BSS 302 in which the WET 310 is located. In step 612, the WET 310 may generate a WLAN header. In step 614, the generated WLAN header may be appended to the LAN PSDU to generate a WLAN frame. In step 615, the WET 310 may encrypt the generated WLAN frame. In step 616, the encrypted WLAN frame may be transmitted via an RF channel 309.

Various embodiments of a system for enabling communication of information in a secure communication system may comprise a collocated device 304 functioning as a configurator that configures a wireless Ethernet terminal 310 functioning as a client station via a network 302. The configured wireless Ethernet terminal 310 may wirelessly receives information from a wireless station 306, and communicate the wirelessly received information to at least one of a plurality of wired stations 324 via at least one of a plurality of corresponding wired interfaces 323.

Another embodiment of the invention provides a machine-readable storage having stored thereon, a computer program having at least one code section for enabling communication of information in a secure communication system. The at least one code section may be executed by a machine for causing the machine to perform steps as described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information, the method comprising:
   performing by one or more processors and/or circuits integrated within a wireless Ethernet terminal:
   transcoding a header of a received wireless local area network (WLAN) frame to generate a local area network (LAN) header;
   decrypting said received WLAN frame prior to said communicating of said LAN frame to a wired LAN station via a corresponding wired interface; and
   communicating said LAN frame based on said generated LAN header.

2. The method according to claim 1, comprising determining a network layer destination address based on said decrypted said received WLAN frame.

3. The method according to claim 1, comprising associating a port at said wireless Ethernet terminal corresponding to said determined network layer destination address.

4. The method according to claim 1, comprising appending said generated LAN header to at least a portion of a WLAN physical layer service data unit to generate said LAN frame.

5. The method according to claim 1, wherein said received WLAN frame indicates a destination address that corresponds to an address within a basic service set (BSS) associated with said wireless Ethernet terminal.

6. A method for communicating information, the method comprising:
   performing by one or more processors and/or circuits integrated within a wireless Ethernet terminal:
   transcoding a header of a received local area network (LAN) frame to generate a wireless local area network (WLAN) header;
   communicating a WLAN frame based on said generated WLAN header; and
   encrypting said WLAN frame prior to said communicating of said WLAN frame to a wireless LAN station via a corresponding wireless interface.

7. The method according to claim 6, comprising determining a network layer destination address based on said received LAN frame.

8. The method according to claim 6, comprising associating a MAC address of a collocated device corresponding to said determined network layer destination address.

9. The method according to claim 6, comprising appending said generated WLAN header to at least a portion of a LAN physical layer service data unit to generate said WLAN frame.

10. The method according to claim 6, wherein said received LAN frame indicates a destination address that corresponds to an address within a basic service set (BSS) associated with a wireless station.

11. A system for communicating information, the system comprising:
   one or more circuits for use in a wireless Ethernet terminal, said one or more circuits being operable to:
   transcode a header of a received wireless local area network (WLAN) frame to generate a local area network (LAN) header, wherein said one or more circuits are operable to decrypt said received WLAN frame prior to said communicating of said LAN frame to a wired LAN station via a corresponding wired interface; and
   communicate a LAN frame based on said generated LAN header.

12. The system according to claim 11, wherein said one or more circuits are operable to determine a network layer destination address based on said decrypted said received WLAN frame.

13. The system according to claim 11, wherein said one or more circuits are operable to associate a port at said wireless Ethernet terminal corresponding to said determined network layer destination address.

14. The system according to claim 11, wherein said one or more circuits are operable to append said generated LAN header to at least a portion of a WLAN physical layer service data unit to generate said LAN frame.

15. The system according to claim 11, wherein said received WLAN frame indicates a destination address that corresponds to an address within a basic service set (BSS) associated with said wireless Ethernet terminal.

16. A system for communicating information, the method comprising:
   one or more circuits for use in a wireless Ethernet terminal, said one or more circuits being operable to:
   transcode a header of a received local area network (LAN) frame to generate a wireless local area network (WLAN) header; and
   communicate a WLAN frame based on said generated WLAN header, wherein said one or more circuits are operable to encrypt said WLAN frame prior to said communicating of said WLAN frame to a wireless LAN station via a corresponding wireless interface.

17. The system according to claim 16, wherein said one or more circuits are operable to determine a network layer destination address based on said received LAN frame.

18. The system according to claim 16, wherein said one or more circuits are operable to associate a MAC address of a collocated device corresponding to said determined network layer destination address.

19. The system according to claim 16, wherein said one or more circuits are operable to append said generated WLAN header to at least a portion of a LAN physical layer service data unit to generate said WLAN frame.

20. The system according to claim 16, wherein said received LAN frame indicates a destination address that corresponds to an address within a basic service set (BSS) associated with a wireless station.

* * * * *